July 12, 1949.

W. R. PRICE 2,475,856

METHOD AND MACHINE FOR WINDING COMPOSITE
GASKETS UNDER UNIFORM PRESSURE

Filed March 2, 1946

INVENTOR
WILLIAM R. PRICE

BY

ATTORNEY

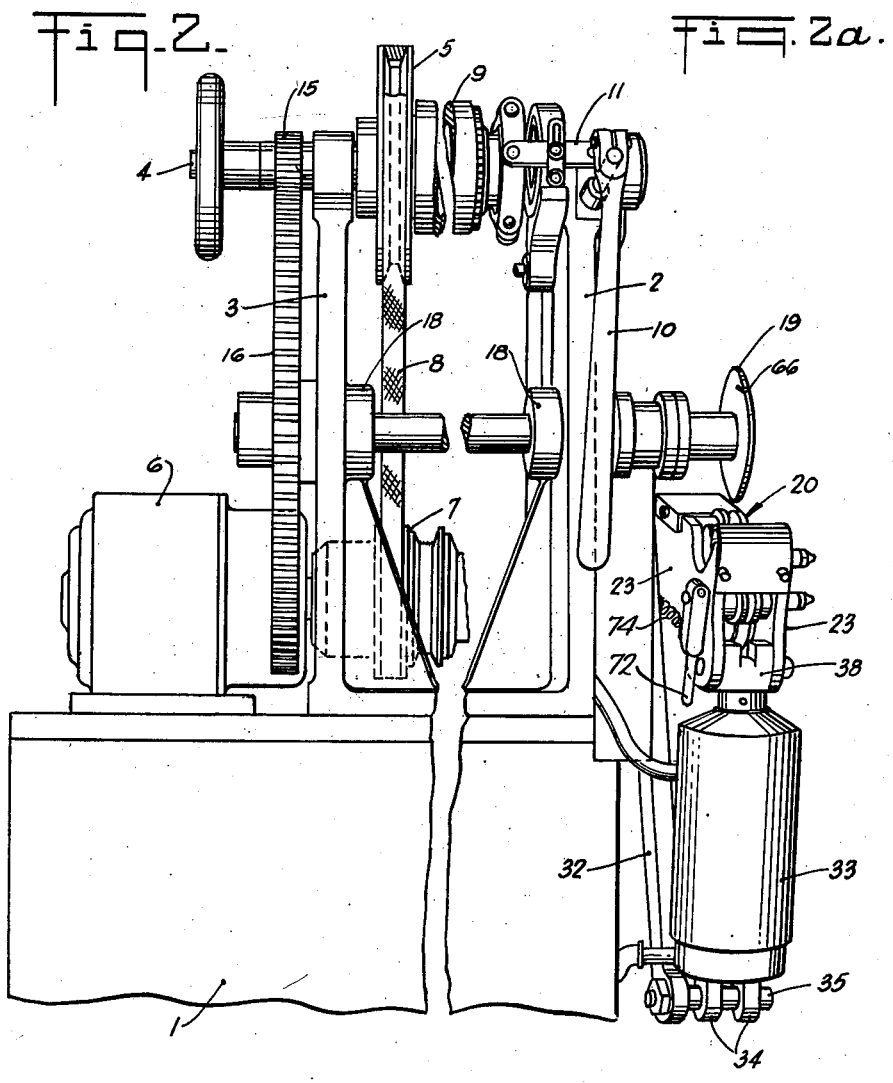

July 12, 1949.
W. R. PRICE
2,475,856
METHOD AND MACHINE FOR WINDING COMPOSITE
GASKETS UNDER UNIFORM PRESSURE
Filed March 2, 1946
8 Sheets-Sheet 3
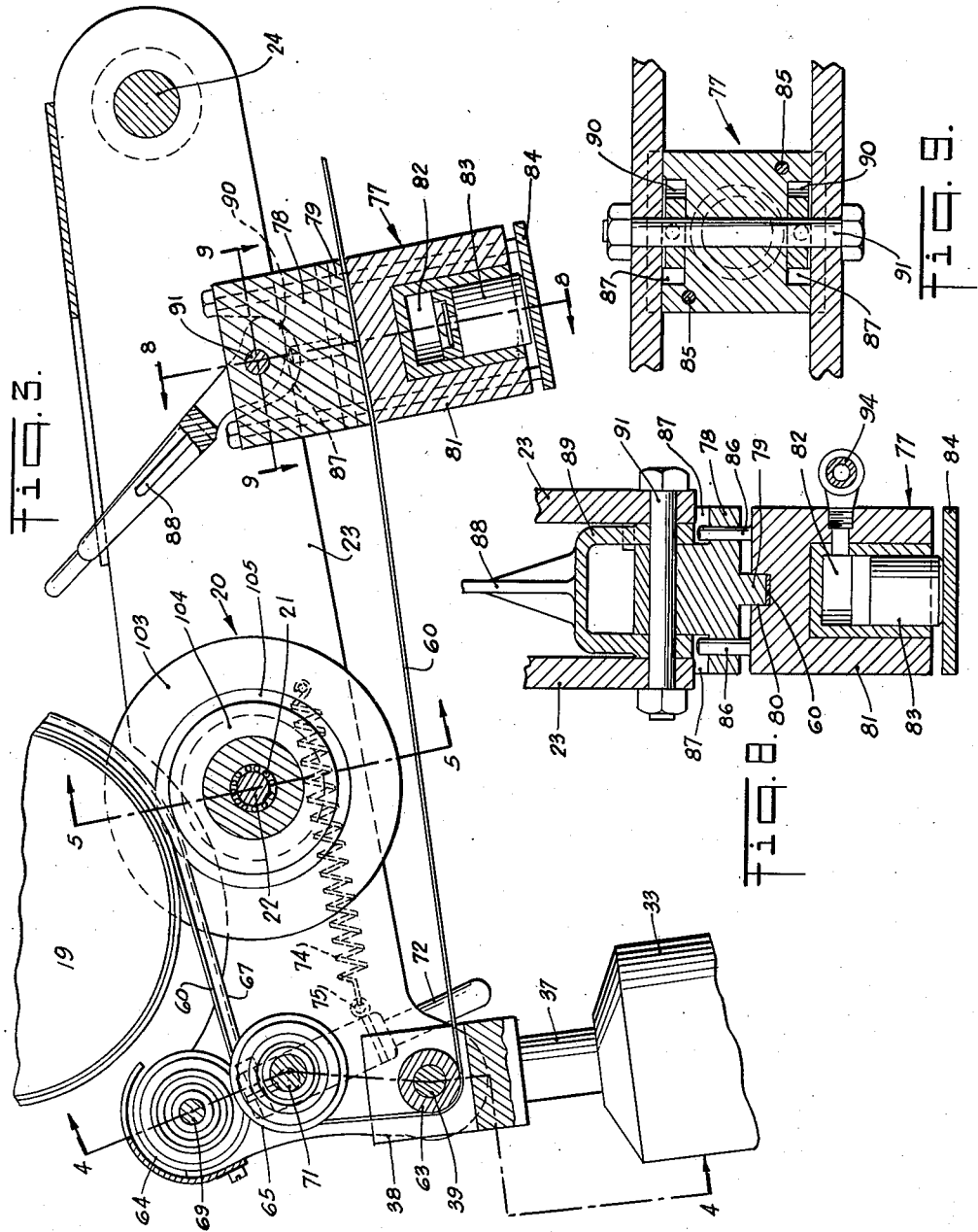
INVENTOR
WILLIAM R. PRICE
BY
ATTORNEY July 12, 1949.  W. R. PRICE  2,475,856
METHOD AND MACHINE FOR WINDING COMPOSITE
GASKETS UNDER UNIFORM PRESSURE
Filed March 2, 1946  8 Sheets-Sheet 4
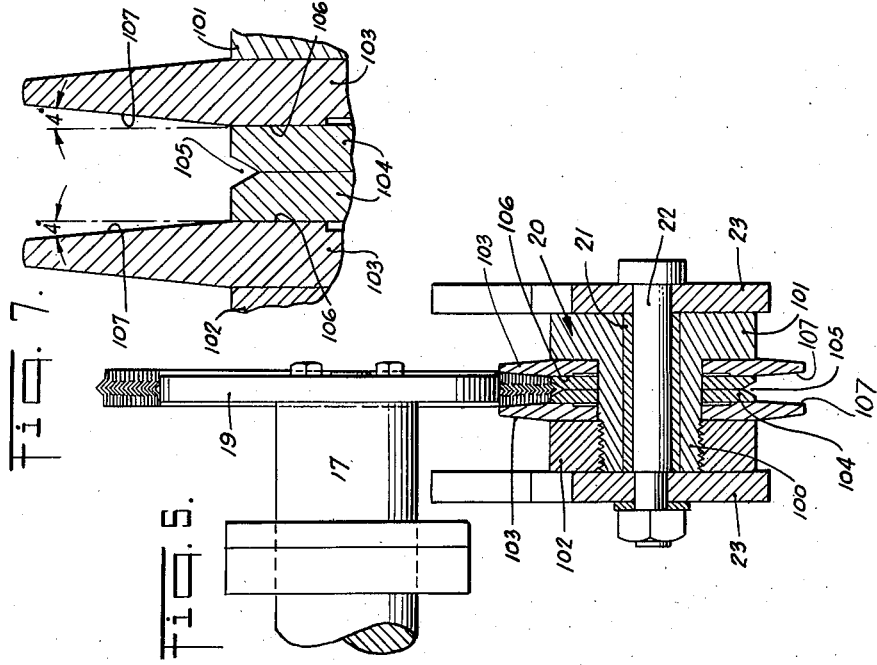
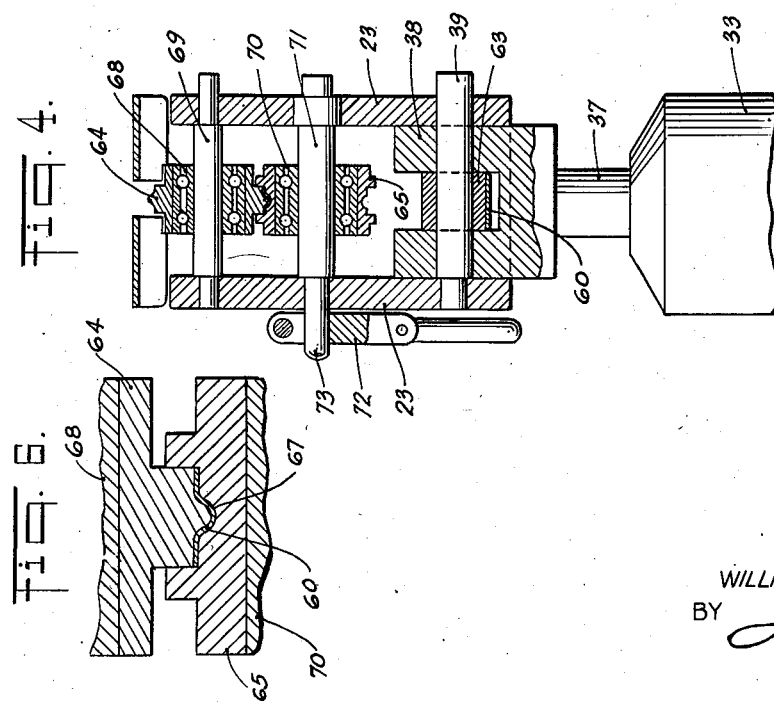
INVENTOR
WILLIAM R. PRICE
BY
ATTORNEY

Fig. 10.

INVENTOR
WILLIAM R. PRICE.
BY
ATTORNEY

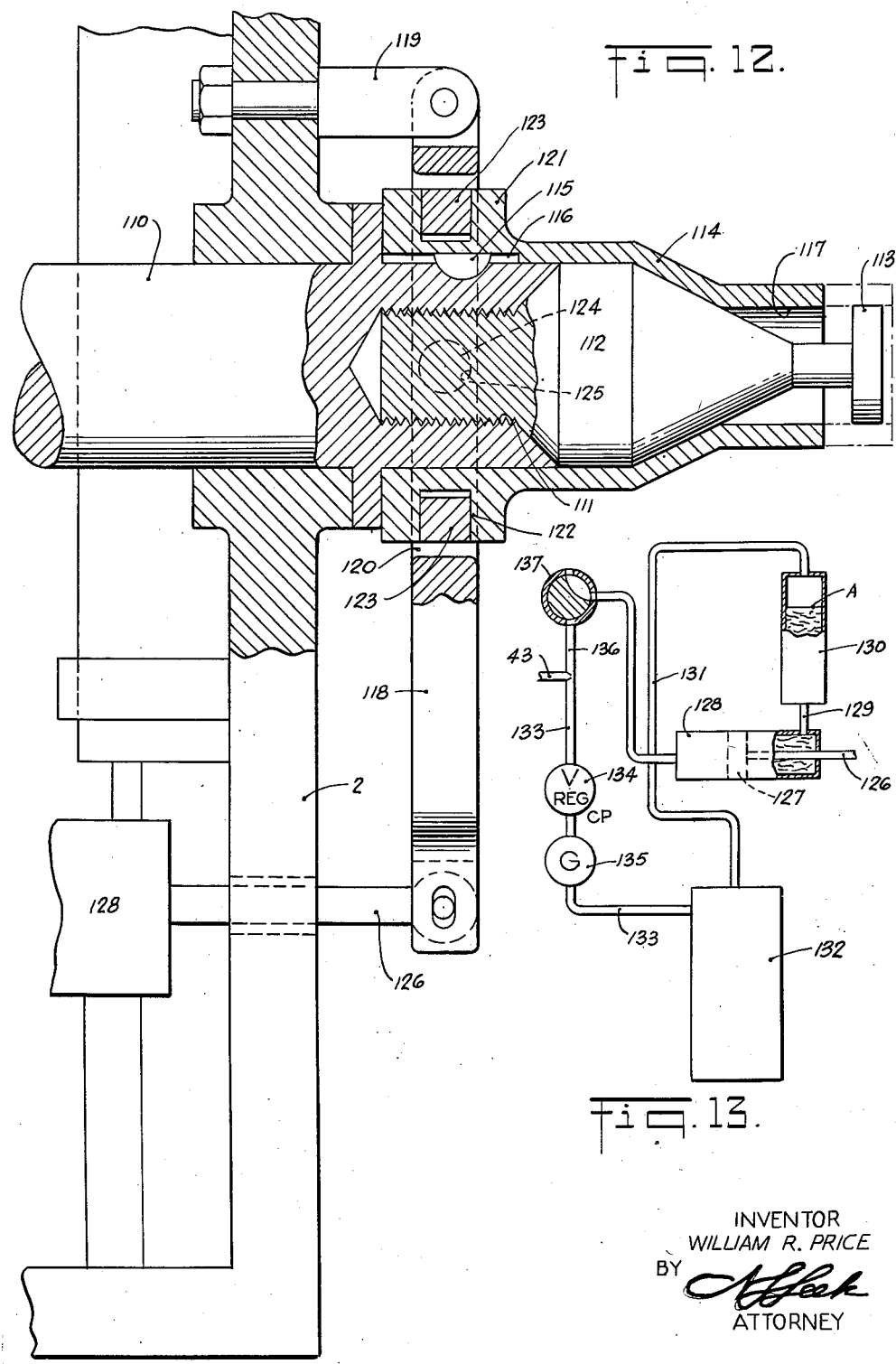

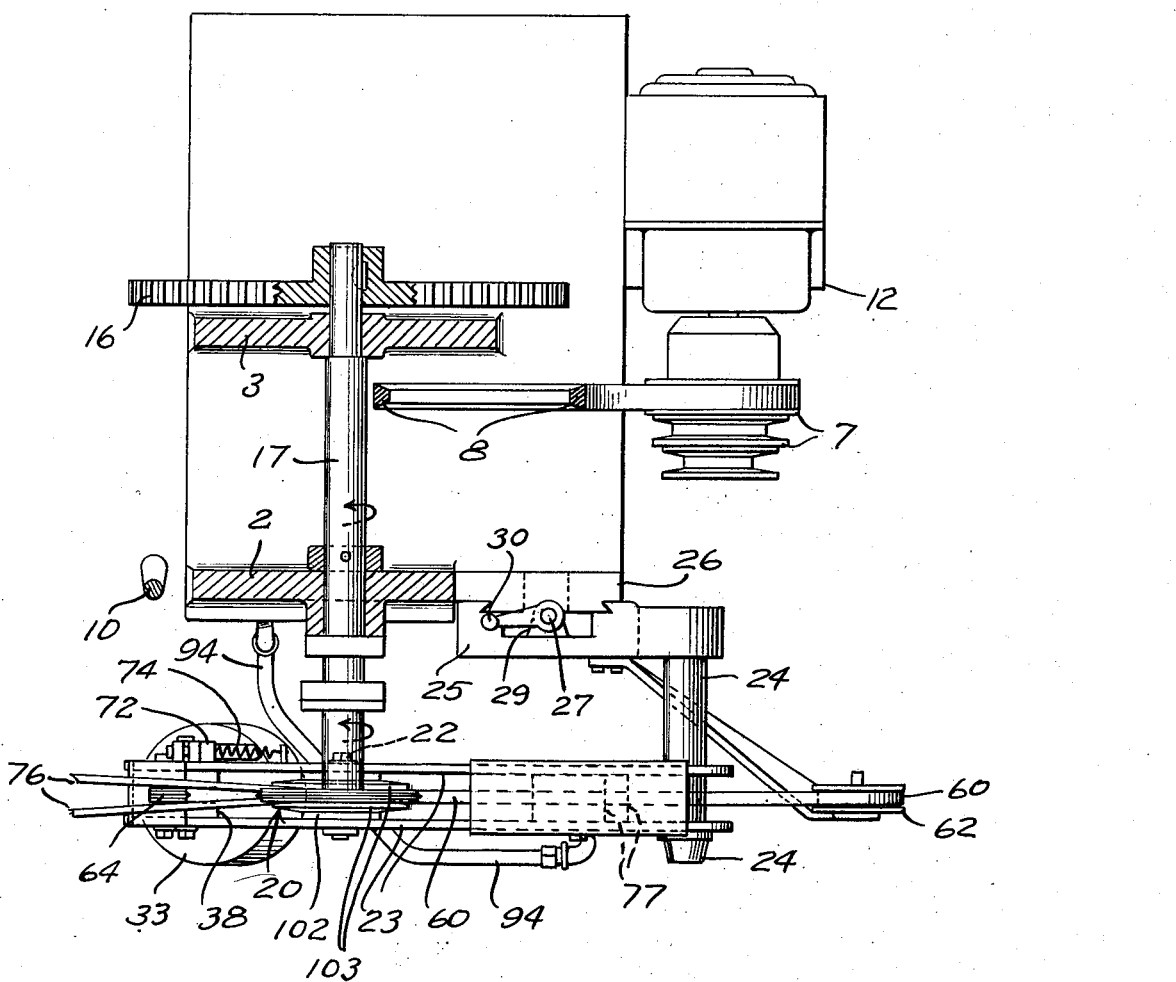

Patented July 12, 1949

2,475,856

UNITED STATES PATENT OFFICE 2,475,856

METHOD AND MACHINE FOR WINDING COMPOSITE GASKETS UNDER UNIFORM PRESSURE

William R. Price, Rosemont, Pa., assignor to Flexitallic Gasket Company, Camden, N. J., a corporation of New Jersey Application March 2, 1946, Serial No. 651,594

9 Claims. (Cl. 153—64)

1

This invention relates to a machine for use in winding composite compressible gaskets of the same general type as the gasket disclosed in the Henry H. Bohmer, Jr., Patent No. 1,829,709, issued October 27, 1931, and in my Patent No. 2,442,311 dated May 25, 1948.

Gaskets of this type are extensively used in all types of high pressure fluid systems, and generally comprise a spirally wound longitudinally corrugated metallic strip with suitable non-metallic packing material between the convolutions of the metallic strip. They are made in many different sizes and shapes, depending upon their intended use. The central opening through the gasket may be circular, elliptical, square, or any other desired form.

In manufacturing these gaskets the metallic strip and the non-metallic packing material are wound upon a rotating mandrel having a peripheral contour corresponding to the central opening through the gasket. One turn of the metallic strip is wound upon the mandrel and spot-welded together and then the metallic strip is wound upon itself for several more convolutions and then spot-welded together again. The non-metallic packing material is now applied and the two are spirally wound together for the desired number of convolutions. At the end of the packing material the abutting convolutions of the metallic strip are spot-welded together and then the metallic strip is wound upon itself for several more convolutions and the end of the strip spot-welded to the underlying convolution.

As the gaskets are being wound the convolutions are pressed tightly together between the mandrel and a cooperating guiding and forming member to which a predetermined pressure is radially applied. This pressure is dependent upon the desired density of the gasket being wound, the greater the pressure, the greater the density. In order to produce gaskets which measure up to the rigid specifications demanded by the trade, it is necessary that the predetermined pressure be accurately maintained without fluctuation throughout the winding of the gasket. In making some of the denser type gaskets it is also necessary to exert a predetermined drag upon the metal strip as it is being fed to the mandrel.

This application is a continuation-in-part of my copending application Serial No. 581,277, filed March 6, 1945, and subsequently abandoned.

The principal object of my invention is to provide an improved machine for spirally winding composite gaskets.

Another object of my invention is to provide

2 in a machine of this character improved means for accurately maintaining a predetermined unvarying pressure upon the convolutions of a spirally wound composite gasket as it is being wound upon a mandrel.

Another object of my invention is to provide, in a machine for spirally winding composite gaskets, improved means for exerting a predetermined drag upon a metal strip as it is being fed into the machine.

Still another object of my invention is to provide, in a machine for spirally winding composite gaskets on a mandrel, improved means for automatically stripping the finished gasket from the mandrel.

Other and more limited objects of the invention will be apparent from the following specification and the accompanying drawings forming a part thereof wherein:

Fig. 2 is a front elevation of the left half of my improved machine viewed from the side indicated by the line 2—2 of Fig 1. Fig. 2a is a perspective of the right half of the machine;

Fig. 3 is an enlarged vertical sectional view through the drag exerting means, the forming rolls and the guiding and forming member, the section being taken on a medial plane between the pivoted arm by which these parts are carried;

Fig. 4 is a transverse section taken on the line 4—4 of Fig. 3;

Fig. 5 is a transverse section taken on the line 5—5 of Fig. 3;

Fig. 6 is an enlarged detail section through the forming rolls;

Fig. 7 is an enlarged detail section through a portion of the guiding and forming member;

Fig. 8 is a transverse section through the drag exerting mechanism taken on the line 8—8 of Fig. 3;

Fig. 9 is a horizontal section on the line 9—9 of Fig. 3;

Fig. 10 is a diagrammatic view illustrating the fluid pressure system;

Fig. 12 is an enlarged vertical section through the gasket stripping mechanism;

Fig. 13 is a diagrammatic view illustrating the fluid pressure operating mechanism of the gasket stripping means;

Fig. 15 is a horizontal section taken on the line 15—15 of Fig. 1.

Figure 1:
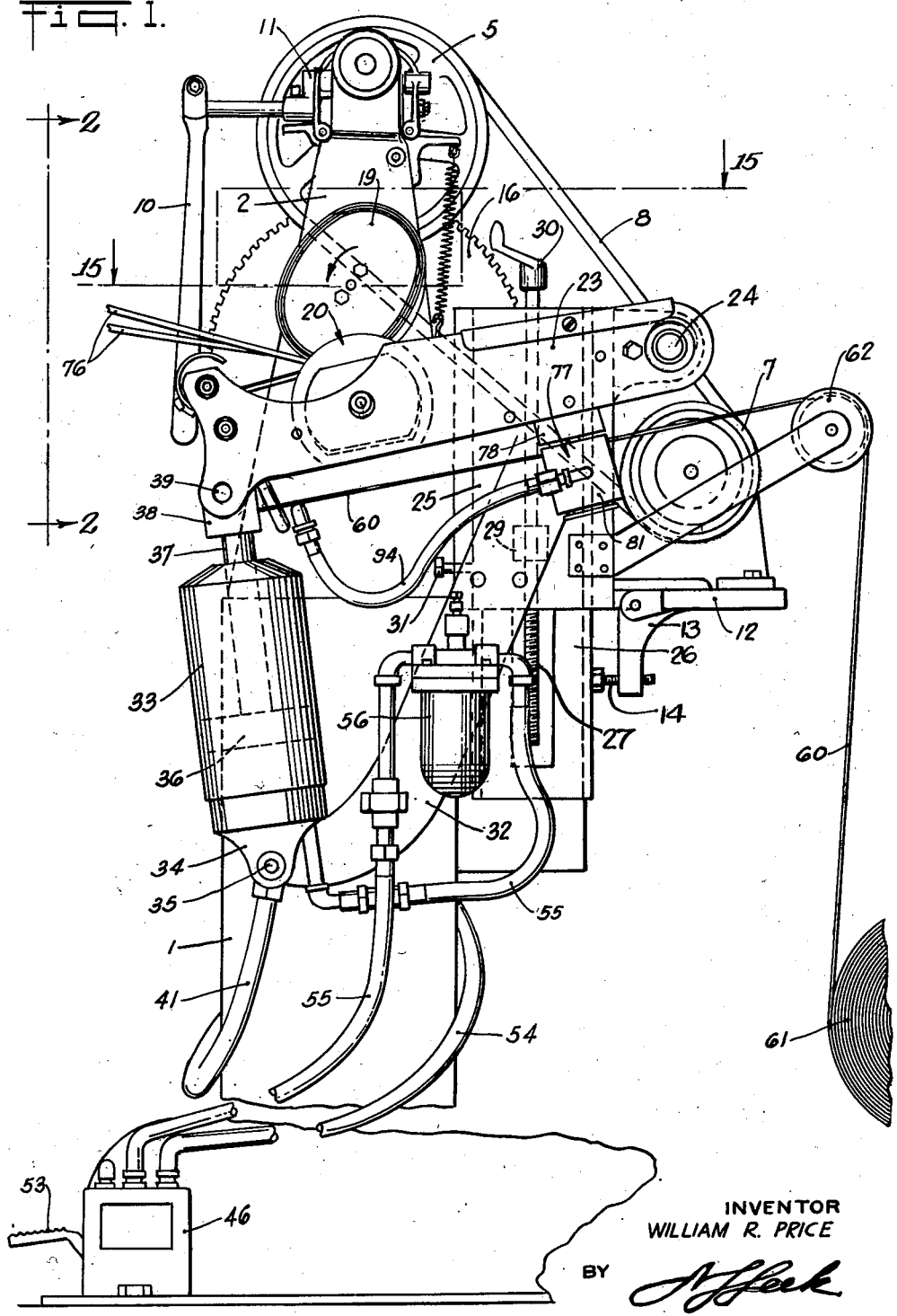
Fig. 1 is a side elevation of a gasket winding machine constructed according to my invention.
Figure 10:
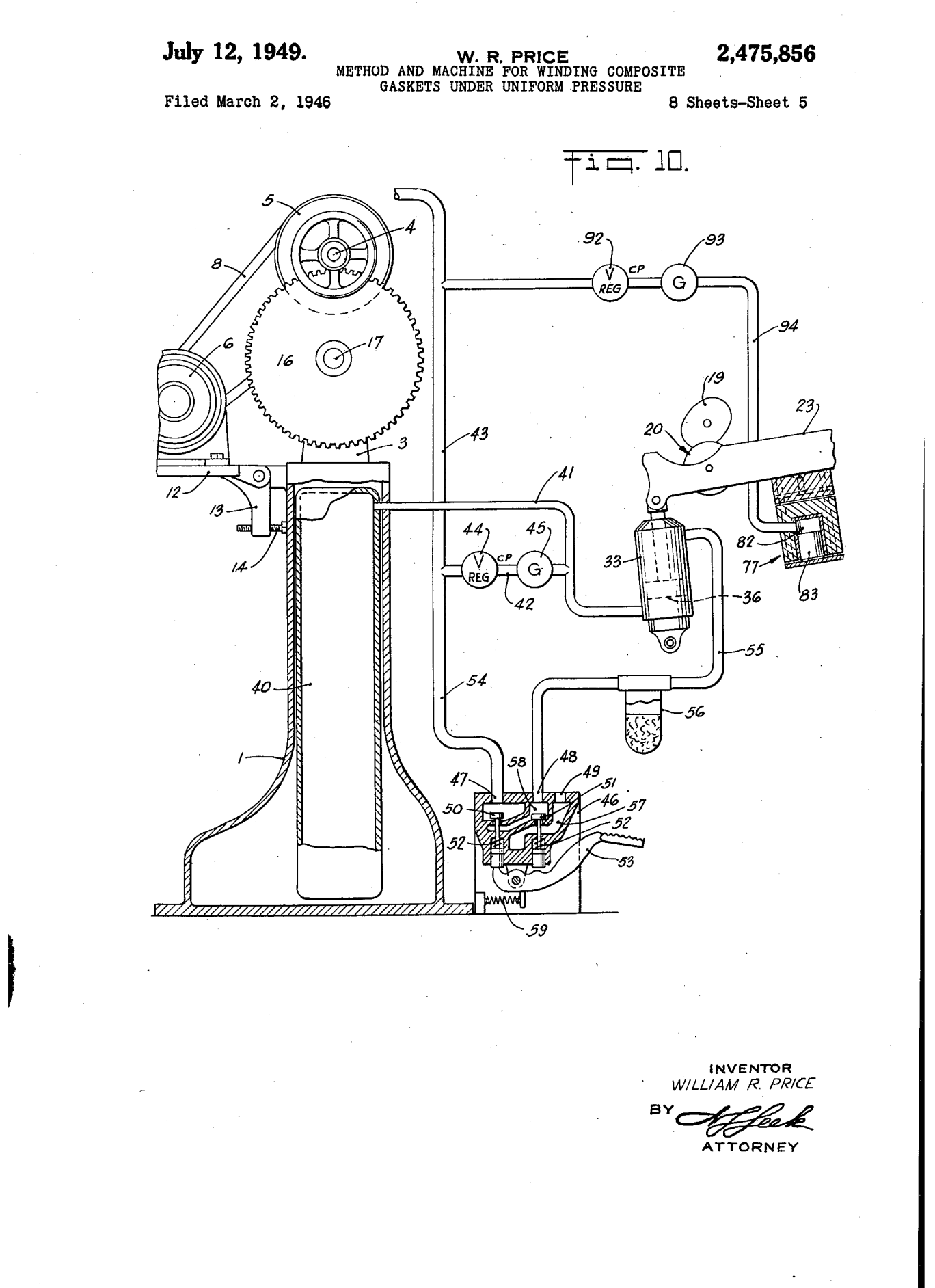
Figure 11:
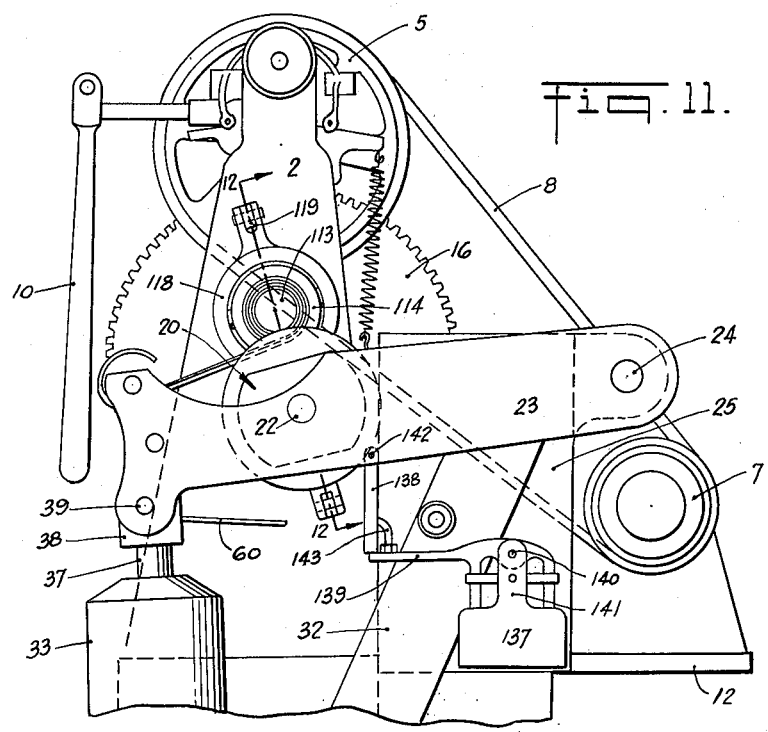
Fig. 11 is a side elevation of a machine equipped with automatic means for stripping a completed gasket from the mandrel.

Referring to the drawings by reference characters the numeral 1 indicates a hollow base having a pair of spaced vertically extending uprights 2 and 3 secured to the top thereof. A shaft 4 which is rotatably supported in suitable bearings at the upper ends of the uprights 2 and 3 has a fly wheel 5 loosely mounted thereon. The fly wheel 5, during operation, is constantly rotated by a motor 6 through a pulley 7 and belt 8, and is connected to and disconnected from the shaft 4 by any suitable clutch 9 which is manually operated through a pivoted lever 10 and connecting linkages 11 between the upper end of the lever 10 and the clutch 9. The motor 6 is mounted on a platform 12 which is adjustably pivoted to the rear side of the base 1 near the upper end thereof. The platform 12 is held in its adjusted position by a depending arm 13 and a bolt 14 (Fig. 10) carried by the arm 13 and adapted to bear against the rear wall of the base. By properly adjusting the platform 12, the desired tension may be maintained upon the belt 8.

A small pinion 15 keyed to the shaft 4 meshes with a large gear 16 which is keyed to one end of a mandrel shaft 17 rotatably supported in bearings 18 carried by the uprights 2 and 3 below the shaft 4. A mandrel 19, upon which a longitudinally corrugated metallic ribbon and a ribbon of non-metallic fibrous material are spirally wound in alternate convolutions to form the gasket, is removably secured to the other end of the shaft 17. The peripheral contour of the mandrel 19 is the same as the central opening through the gasket being formed thereon and may be any size and shape as desired.

A guiding and forming member, generally indicated by the numeral 20, is rotatably supported in operative relation to the mandrel 19 upon a bearing 21 and shaft 22 between two spaced parallel arms 23. The member 20 guides and supports the ribbons of gasket material as they are wound upon the mandrel 19. During the winding the member 20 is forced toward the mandrel with a predetermined unvarying pressure by means hereinafter described and it regulates the thickness and density of the gasket.

The arms 23 are pivotally mounted at the rear ends thereof upon a stud 24 which is secured to the upper end of a slide 25, at the rear thereof. The slide 25 is slidably mounted for vertical movement upon a guide 26 secured to one side of the base 1. A screw 27 which is rotatably mounted in any suitable manner in a vertical slot 28 in the guide 26 extends through and engages a threaded bore in a block 29 which is rigidly secured to the inner face of the slide 25 and projects into the slot 28. The screw 27 is rotated by a crank 30 applied to the upper squared ends thereof and is operative to adjust the slide up and down as desired upon the guide 26 and to hold the slide in adjusted position. Bolts 31 are also provided for rigidly clamping the slide to the guide in the desired position. A bracket 32 is rigidly secured at its upper end to the slide 25 and extends downwardly and forwardly therefrom. A cylinder 33 is pivotally supported by ears 34, thereon, upon a stud 35 carried by and extending outwardly from the lower end of the bracket 32. A piston 36 is slidably mounted in the cylinder 33 and has secured thereto a piston rod 37 which extends out through suitable packing in the upper end of the cylinder 33 and is pivotally connected to the forward ends of the arms 23 by a clevis 38 and a pin 39. Air under a predetermined pressure is constantly admitted to the cylinder 33 beneath the piston 36 during the operation of the machine. This air pressure, during the winding of the gasket on the mandrel 19, urges the piston 36 upwardly in the cylinder 33 which through the piston rod 37 lifts the forward ends of the arms 23, rocking them on the stud 24. The arms 23 in turn hold the member 20 tightly against the gasket as it is being wound on the mandrel 19 with a pressure which is directly proportionate to the pressure of the air beneath the piston 36. In winding a truly circular gasket there is no oscillating movement imparted to the arms 23. The only movement is a slow constant downward movement as the diameter of the gasket increases upon the mandrel 19. But in winding other shaped gaskets, such as the elliptical gasket shown herein, the arms 23 are oscillated through a considerable distance about the stud 24, which moves the piston 36 up and down in the cylinder 33 against the pressure of the air therein. This up and down movement of the piston 36 would normally cause a substantial fluctuation in the pressure of the air in the cylinder 33, the amount of fluctuation depending on the distance the piston 36 was moved. Since it is essential, in order to get good gaskets, that the pressure applied to the gasket as it is being wound be maintained constant without fluctuation, means are provided which eliminate this fluctuation in pressure. Means are also provided, in connection therewith, for overcoming the pressure beneath the piston 36 so as to move the piston down in the cylinder 33 to withdraw the guiding and forming member 20 away from the finished gasket on the mandrel 19 and allow it to be stripped therefrom. These means will now be described in connection with Fig. 10.

A surge tank 40 having many times the volumetric capacity of the cylinder 33 is provided within the base 1. A conduit 41 connects the upper end of the tank 40 with the lower end of the cylinder 33, beneath the piston 36. The conduit 41 is connected by a conduit 42 to a supply line 43 which in turn is connected to any suitable source of compressed air. Air then is admitted under pressure to the surge tank 40 and the cylinder 33 from the supply line 43 through the conduits 42 and 41. The pressure of the air in the tank 40 and cylinder 33 is controlled and adjusted by a pressure regulator valve 44 and a gauge 45 in the conduit 42, it being understood that different types of gaskets require that different pressures be applied thereto by the member 20 during winding. The combined volumetric capacity of the tank 40 and the cylinder 33 is so large that the slight variation therein due to any movement of the piston 36 in the cylinder 33 will have no appreciable effect upon the pressure of the air therein.

The movement of the arms 23 to bring the guiding and forming member 20 into and out of operative association with the mandrel 19 is controlled by a foot-operated three-way valve 46 having ports 47, 48 and 49, and valves 50 and 51 which are urged to closed position by springs 52 and are opened by a foot treadle 53. The port 47 is connected to the supply line 43 by a conduit 54, and the port 48 is connected to the top of the cylinder 33 above the piston 36 by a conduit 55. A lubricator 56 for supplying lubricant to the cylinder 33 is connected to the conduit 55. During the winding of a gasket the valve 50 is closed and the valve 51 is open. This vents the top of the cylinder 33 above the piston 36 to the atmosphere through the passageway 57 and port 49, and allows the constant predetermined pressure in the cylinder 33 below the piston 36 to force the piston 36 up in the cylinder 33 which raises the forward ends of the arm 23, and they in turn bring the member 20 up into operative relationship with the mandrel 19. After a gasket has been wound the treadle 53 is depressed by the operator to the position shown in Fig. 10 which opens the valve 50 and closes the valve 51. This will admit air under full line pressure, which is considerably greater than the pressure in the tank 40, to the top of the cylinder 33 above the piston 36, through the passageway 58 and conduit 55. The piston 36 will then be forced down in the cylinder 33 against the pressure of the air therebeneath, which lowers the forward ends of the arm 23 and moves the member 20 away from the mandrel 19 so that the finished gasket can be stripped from the mandrel. When the operator removes his foot from the treadle 53 the treadle will be raised by a spring 59 which opens the valve 51 and allows the valve 50 to close. The top of the cylinder 33 will then again be vented to the atmosphere and the pressure beneath the piston 36 will raise the parts back to winding position.

During winding the metallic ribbon 60 is drawn from a reel 61 by the mandrel 19. From the reel 61 the ribbon extends up over a roller 62 and then forwardly under the arms 23 and over a roller 63 rotatably supported by the pin 39 between the arm of the clevis 38. After leaving the roller 63 the ribbon 60 passes between two forming rolls 64 and 65 and from there to the mandrel 19 where the end of the ribbon is secured in a notch 66 (Fig. 2) in the periphery of the mandrel. As the ribbon is drawn between the forming rolls 64 and 65, a centrally disposed longitudinally extending bead or corrugation 67 is formed therein.

The forming roll 64 is mounted on a bearing 68 carried by a shaft 69 extending between the arms 23. The cooperating forming roll 65 is mounted on a bearing 70 carried by an eccentric 71 rotatably supported between the arms 23 below the shaft 69. A depending lever 72, which is fastened to the eccentric shaft 73, has one end of a coiled spring 74 (Fig. 3) secured thereto as indicated at 75. The other end of the spring 74 is fastened to a lug on the adjacent arm 23. The spring 74 through the lever 72 urges the eccentric 71 in a counter-clockwise direction, as viewed in Fig. 3, which yieldingly holds the forming roll 65 against the ribbon 60 with a predetermined pressure which is dependent upon the tension of the spring 74. With this construction the forming rolls 64 and 65 will automatically adjust themselves to any variation in the thickness of the ribbon, such as a welded joint. When inserting a new ribbon the operator moves the roll 65 away from the roll 64 by rotating the eccentric 71 in a clockwise direction (Fig. 3) with the lever 72.

After the metallic ribbon 60 has been wound upon itself, on the mandrel 19, for several convolutions, the ends of two ribbons 76 of fibrous packing material are inserted. The ribbons 76 are inserted side by side and their combined width is equal to the width of the metallic ribbon 60. The metallic ribbon 60 and the ribbons 76 of packing material are then wound together in alternate convolutions until the gasket reaches the proper size. The metallic ribbon is then wound upon itself for several more convolutions and cut off. The end is then spot-welded to the underlying ribbon, and the finished gasket is stripped from the mandrel after the guiding and forming member 20 has been moved out of the way. The machine is now ready to start winding the next gasket.

It has been found that in winding denser type gaskets better results are obtained if a drag is exerted on the metallic ribbon 60 as it is drawn from the reel 61 towards the mandrel 19. For this purpose I have provided a drag exerting mechanism generally indicated by the numeral 77 through which the metallic ribbon 60 is drawn between the rollers 62 and 63. This drag mechanism includes a block 78 which is secured to and between the arms 23 and projects downwardly therefrom. A centrally disposed downwardly extending rib 79 on the block 78 cooperates with a complementary groove 80 formed in the upper surface of a block 81. The ribbon 60 is drawn through the groove 80 beneath the rib 79. The block 81 has a cylindrical chamber 82 therein which is open at its lower end and closed at its upper end. A piston 83, which is supported by a plate 84 suspended by bolts 85 below the block 81, extends into the chamber 82. The bolts 85 are secured to the block 78 and extend downwardly therefrom through apertures in the block 81 so that the block 81 may move up and down thereon. Pins 86 which are secured to the upper surface of the block 81 extend up into recesses 87 formed in the sides of the block 78. A lever 88 having a bifurcated lower end 89, the legs of which terminate in cams 90, is pivotally supported by a bolt 91 with the cams 90 disposed in the recesses 87 above the upper ends of the pins 86. Air under a predetermined pressure which is controlled by a pressure regulator valve 92 and a gauge 93, is constantly admitted to the chamber 82 above the piston 83 through a conduit 94. This air pressure urges the block 81 upwardly, on the bolts 85 and piston 83, into frictional engagement with the ribbon 60 beneath the rib 79. This frictional engagement of the block 81 with the ribbon 60 exerts a dragging or braking action upon the ribbon 60 which tends to retard its movement as it is drawn through the groove 80. The amount of drag is regulated by the air pressure in the chamber 82, the greater the pressure the greater the drag. If it is desired to release the drag on the ribbon or to insert a new ribbon, the lever 88 is swung to the right (Fig. 3) which causes the cams 90 to engage the pins 86 and depress the block 81 against the air pressure in the chamber 82, thus increasing the distance between the bottom of the rib 79 and the top of the block 81 in the groove 80. This will release all drag on the ribbon 60 and will enable the ready insertion of a new ribbon.

The guiding and forming member 20 includes a hub 100 (Fig. 5) which has an annular flange 101 at one end thereof and has the other end threaded for the reception of a nut 102. Removably secured upon the hub 100 between the flange 101 and the nut 102 are a pair of similar circular confining discs 103 and a pair of similar circular pressure discs 104, which are disposed between the discs 103.

The adjacent edges of the discs 104 are beveled to form a V-shaped annular groove 105 into which the bead 67 of the metallic ribbon 60 projects during winding. The combined width of the discs 104 is equal to the width of the mandrel 19, and to the width of the ribbon 60 after it has had the bead 67 formed therein, and it is through these discs 104 that the radial pressure is applied to the gasket as it is being wound.

The diameter of the discs 103 is greater than the diameter of the discs 104. The difference in diameter between the discs 103 and 104 is dependent upon the size of the gasket being wound and is slightly greater than twice the difference between the inner and outer peripheries thereof. Each disc 104 has a plane surface 106 concentric with and of the same diameter as the discs 103. From the plane surface 106, the discs 104 are flared outwardly at an angle of about 4° as indicated at 107 (Fig. 7). The discs 104 confine and form the gasket laterally as it is being wound. The flare or taper 107 eliminates uncontrolled friction due to the lateral or side pressure of the gasket as it is being wound under the substantial radial pressure exerted by the disc 104. It also shapes the gasket with a taper so that it gradually decreases in thickness from the inner periphery to the outer periphery. This slight taper has been found to be very desirable in gaskets of this type as is pointed out in my aforesaid co-pending application.

After a gasket has been wound upon the mandrel 19 it frictionally adheres thereto so tightly that it is necessary to use a suitable tool to manually strip it therefrom. This method of removing the basket from the mandrel consumes considerable time and sometimes damages the gasket.

In Figs. 11 to 14 I have illustrated power-operated means for automatically stripping the gasket from the mandrel. This means is rendered operative by the downward movement of the arms 23 as they are withdrawing the member 20 from operative association with the mandrel.

Referring now to Figs. 11 to 14 the numeral 110 indicates a mandrel shaft having a threaded bore 111 in the end thereof, into which the shank 112 of a mandrel 113 is removably secured. A gasket stripping sleeve 114 is slidably mounted about the mandrel shank 112 and the end of the mandrel shaft 110, and is constrained to rotate therewith by means of a key 115 carried by the shaft 110 and projecting into an elongated keyway 116 in the sleeve 114. The inner periphery 117 of the outer open end of the sleeve 114 adjacent the mandrel 113 is the same size and shape as the periphery of the mandrel 113. To strip a gasket from the mandrel 113, the sleeve 114 is moved from the full line position to the dotted line position shown in Fig. 12 by a lever 118 which is pivotally secured at its upper end to a lug 119 projecting outwardly from the upright 2. The lever 118 is enlarged intermediate its ends and has a circular bore 120 therethrough, through which the sleeve 114 extends. The rear end of the sleeve 114 within the bore 120 is enlarged as indicated at 121 and has an annular groove 122 therein. A pair of arcuate shoes 123 are disposed within the groove 122 and each carries a trunnion 124 which extends outwardly into a bearing 125 in the lever 118.

The lower end of the lever 118 is pivotally connected to the outer end of a piston rod 126 which is secured at its inner end to a piston 127 within a cylinder 128. The forward end of the cylinder 128 is connected by a conduit 129 to the bottom of a chamber 130 which is filled with oil up to the level marked A in Fig. 13. The upper end of the chamber 130 is connected by a conduit 131 to a pressure tank 132. Air under pressure is admitted to the tank 132 from the supply line 43 through a conduit 133; and from the tank 132 to the chamber 130 above the oil therein through the conduit 131. The pressure of the air within the tank 132 and chamber 130 is controlled and regulated by a pressure regulator valve 134 and a gauge 135. The rear end of the cylinder 128 behind the piston 127 is either vented to the atmosphere or connected to the line 43 by a conduit 136 and a three way valve 137 of standard construction, which is suitably secured to the slide 25. The valve 137 is spring operated to vent the cylinder 128 to the atmosphere, and is operated to connect the cylinder 128 to the high pressure air line 43 by the movement of the arms 23 through a depending latch 138 and a lever 139, which is pivoted at 140 to an ear 141 extending upwardly from the valve body. The latch 138 is pivoted at 142 to one of the arms 23 and is arranged to engage the end of the lever 139 when the arms 23 are in the up or winding position.

Figure 14:
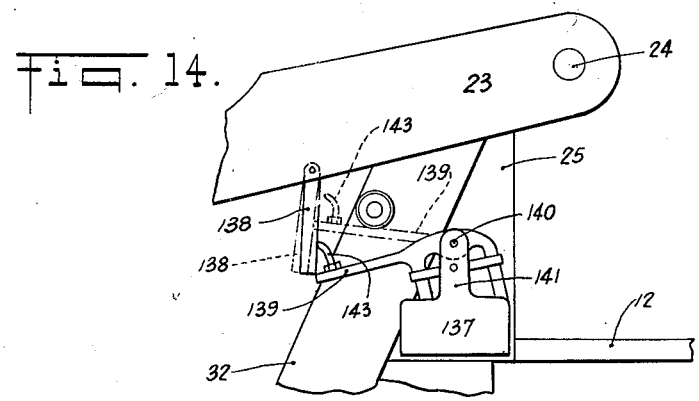
Fig. 14 is a detail view illustrating the manner in which the control valve of the gasket stripping means is automatically operated.

After a gasket has been completed the treadle 53 is depressed to effect lowering of the forward ends of the arms 23, as has been previously described. As the arms 23 carry the latch 138 downwardly it will depress the end of the lever 139 which will operate the valve 137 to connect the cylinder 128 behind the piston 127 to the air supply line 43. This will force the piston 127 forwardly in the cylinder 128 and through the piston rod 126 and lever 118, move the sleeve 114 to the dotted line position shown in Fig. 12, stripping the gasket from the mandrel 113. After the arm 23 has depressed the lever 139 a predetermined distance the latch 138 will be moved out of engagement with the end of the lever 139 by an upwardly extending abutment 143, secured to the lever 139, as shown in Fig. 14. The lever will then be returned to its normal up position and the valve 137 operated to vent the cylinder 128 to the atmosphere which will permit the air pressure in the tank 132 and chamber 130 to move the piston 127 rearwardly in the cylinder 128 returning the sleeve 114 from the dotted line position (Fig. 12) back to its normal position. The oil in the chamber 130 and the forward end of the cylinder 128 acts as a cushion and prevents a too rapid operation of the sleeve 114.

Suitable electric welding apparatus for spot-welding the convolutions of the gasket together at the proper places is provided upon the machine, but since that apparatus forms no part of this invention it is not illustrated or described herein.

From the foregoing it will be apparent to those skilled in this art that I have provided a simple and efficient mechanism for accomplishing the objects of my invention.

It is to be understood that I am not limited to the specific construction shown and described herein as various modifications can be made therein within the scope of the appended claims.

What is claimed is:

1. In a machine for spirally winding composite gaskets having alternate convolutions of metallic and nonmetallic material the combination of a mandrel upon which said material is wound to form a gasket, means for rotating said mandrel, guiding and forming means engaging the sides and the outer periphery of the gasket during winding, means for yieldingly holding said guiding and forming means against the outer periphery of the gasket with a predetermined pressure during winding, said guiding and forming means comprising a wheel having an annular groove with flaring side walls formed therein.

2. In a machine for spirally winding composite gaskets having alternate convolutions of metallic and nonmetallic material the combination of a mandrel upon which said material is wound to form a gasket, means for rotating said mandrel, guiding and forming means engaging the sides and the outer periphery of the gasket during winding, means for yieldingly holding said guiding and forming means against the outer periphery of the gasket with a predetermined pressure during winding, said guiding and forming means comprising a composite member made up of inner and outer concentrically disposed circular discs, said outer discs being of greater diameter than said inner discs and having opposed surfaces which flare outwardly from the periphery of said inner discs.

3. The method of making composite compressible gaskets comprising spirally winding strips of material in alternate convolutions upon a mandrel, applying a predetermined radially directed unvarying pressure to the outer convolution as the gasket is being wound and confining the sides of the gasket at the point where the pressure is applied between confining members having opposed outwardly flaring surfaces.

4. The method of making composite compressible gaskets comprising spirally winding strips of material in alternate convolutions upon a mandrel, applying a predetermined radially directed unvarying pressure to the outer convolution as the gasket is being wound and so confining the sides of the gasket during winding that the finished gasket is caused to taper in thickness from its inner periphery to its outer periphery.

5. The method of making composite compressible gaskets comprising spirally winding a strip of longitudinally beaded metallic material of uniform width and a second strip of material in alternate convolutions upon a mandrel, applying a predetermined radially directed unvarying pressure to the outer convolution as the gasket is being wound of a value to deform the bead and cause each convolution to gradually increase in width as successive convolutions are wound thereupon and so confining the sides of the gasket during winding that the finished gasket is caused to taper in thickness from its inner to its outer periphery.

6. In a machine for spirally winding composite gaskets including a metal ribbon, the combination of a frame, a mandrel upon which the gasket is wound rotatably supported by said frame, means for rotating said mandrel, an arm pivotally supported at one end by said frame, a pressure roller mounted on said arm intermediate the ends thereof for cooperating with said mandrel in winding said gasket, forming rollers mounted on said arm adjacent its free end to receive and form said ribbon prior to passage to said mandrel for winding, a cylinder pivotally supported at one end by said frame, a piston slidably mounted in and having its rod projecting from the other end of said cylinder, the free end of said rod being pivotally connected to the free end of said arm, means including a surge tank for constantly exerting a predetermined substantially unvarying fluid pressure against one end of said piston, and means for selectively exerting a greater fluid pressure against the other end of said piston for retracting the pressure roller.

7. In a machine for spirally winding composite gaskets including a metal ribbon, the combination of a frame, a mandrel upon which the gasket is wound rotatably supported by said frame, means for rotating said mandrel, a normally stationary slide secured to said frame for vertical adjustment in accordance with the size of the gasket being wound, an arm pivotally secured at one end to said slide, a pressure roller mounted on said arm intermediate the ends thereof for cooperating with said mandrel in winding said gasket, forming rollers mounted on said arm adjacent its free end to receive and form said ribbon prior to passage to said mandrel for winding, a bracket secured to said slide and projecting outwardly therefrom, a cylinder pivotally secured at one end to said bracket, a piston slidably mounted in and having its rod projecting from the other end of said cylinder, the free end of said rod being pivotally connected to the free end of said arm, means including a surge tank for constantly exerting a predetermined substantially unvarying fluid pressure against one end of said piston for holding said pressure roller in pressure engagement with the gasket on said mandrel, and means for selectively exerting a greater fluid pressure against the other end of said piston for retracting the pressure roller.

8. In a gasket winding machine, as set forth in claim 6 a stripping sleeve mounted on said mandrel for rotation therewith and slidable axially thereof, fluid pressure means to advance said sleeve axially for stripping the wound gasket from the mandrel, and means responsive to the retraction of said arm to actuate said last fluid pressure means.

9. In a gasket winding machine, as set forth in claim 6, eccentric means mounting one of said forming rollers for movement toward or away from the other forming roller, resilient means urging said eccentric means in a direction to hold said rollers in pressure engagement, and means shifting said eccentric means to separate said rollers for threading said ribbon.

WILLIAM R. PRICE.

REFERENCES CITED

The following references are of record in the file of this patent:

UNITED STATES PATENTS

| Number | Name | Date |
| --- | --- | --- |
| 650,887 | Wilkerson | June 5, 1900 |
| 1,388,428 | Hessing | Aug. 23, 1921 |
| 1,475,855 | Murdock | Nov. 27, 1923 |
| 1,503,272 | Lewellyn | July 29, 1924 |
| 1,627,604 | Hittle | May 10, 1927 |
| 1,793,104 | Larsen | Feb. 17, 1931 |
| 2,176,719 | Peyton | Oct. 17, 1939 |
| 2,324,115 | Schultz | July 13, 1943 |
| 2,389,109 | Weisberger | Nov. 13, 1945 |